United States Patent [19]

Arnold

[11] 3,866,813

[45] Feb. 18, 1975

[54] AXIALLY ADJUSTABLE LIP SEAL ASSEMBLY

[75] Inventor: Donovan Y. Arnold, Peoria, Ill.

[73] Assignee: Caterpillar Tractor Co., Peoria, Ill.

[22] Filed: Nov. 30, 1973

[21] Appl. No.: 420,721

[52] U.S. Cl............................ 277/9, 277/136, 277/189
[51] Int. Cl............................................. F16j 15/32
[58] Field of Search ......... 277/9, 9.5, 126, 136, 35, 277/37, 189, 137, 181

[56] References Cited
UNITED STATES PATENTS

| | | | |
|---|---|---|---|
| 2,504,496 | 4/1950 | Carter | 277/126 |
| 3,563,555 | 2/1971 | Koons | 277/9 |
| 3,727,923 | 4/1973 | McEwen | 277/9 |
| 3,773,336 | 11/1973 | Walter et al. | 277/9 |

FOREIGN PATENTS OR APPLICATIONS

| | | | |
|---|---|---|---|
| 528,214 | 10/1940 | Great Britain | 277/35 |

Primary Examiner—Richard E. Aegerter
Assistant Examiner—Robert I. Smith
Attorney, Agent, or Firm—Phillips, Moore, Weissenberger, Lempio & Strabala

[57] ABSTRACT

A lip seal assembly provides an axially adjustable seal between a rotating shaft, such as a crankshaft, and a stationary housing, such as an engine block. The assembly includes a generally cylindrical, ring-shaped adapter which is mounted on the housing to circumvent the shaft and a ring-shaped seal retainer which is slidably received within the adapter about the shaft. The retainer carries a lip seal which engages the running surface of the shaft. The adapter and retainer are coupled by means such as threaded portions which permit selective rotation of one with respect to the other whereby the axial location of the retainer within the adapter may be changed.

9 Claims, 2 Drawing Figures

PATENTED FEB 18 1975

3,866,813

AXIALLY ADJUSTABLE LIP SEAL ASSEMBLY

BACKGROUND OF THE INVENTION

This invention relates to a rotary seal assembly which provides a dynamic seal between a rotating shaft and a stationary housing. More specifically, it relates to a lip seal assembly which is adjustable axially along such a shaft.

Rotary seals, such as those used on the ends of crankshafts and the like, oftentimes fail prematurely due to the rubbing action which occurs between the seal face and the running surface of the shaft. This rubbing action causes the wearing off of the seal face and the wearing of a groove into the shaft. Consequently, sealing effectiveness is considerably reduced. This problem is particularly severe when the shaft and seal are exposed to an environment having abrasive particles which tends to increase the wear rate.

In the past, after sufficient wear had occurred to cause leakage past the seal, the crankshaft normally had to be removed from the engine and the shaft running surface reground in order to eliminate the groove worn therein by the seal. Then the crankshaft had to be reassembled with a new seal.

U.S. Pat. No. 3,595,585 proposes a method for overcoming this problem. It describes the utilization of a rotary seal assembly which is removed from the shaft and axially reversed and remounted, such that the seal face is repositioned at a new location on the running surface of the shaft. However, when such an assembly is used on the rearward end of a crankshaft, adjacent to the flywheel, its removal is not possible without first removing the flywheel. Obviously, this procedure is time consuming and expensive.

SUMMARY OF THE INVENTION

The present invention relates to a rotary seal assembly for providing a dynamic seal between a rotating shaft and a stationary housing. The assembly includes three basic members: an adapter which is mounted on the housing and has a through bore for receiving the shaft; an insert having a through bore for passing the shaft which is received within the through bore of the adapter and coupled thereto by means which permits its axial position within the adapter through bore to be varied without removing it from within the adapter through bore; and a seal carried by the insert which contacts the shaft in sealing engagement. It also includes means for providing a static seal between the adapter and insert.

Axial adjustment of the insert moves the seal carried thereby to a new location on the running surface of the shaft. In this manner shaft wear may be distributed over a greater portion of the shaft length, thereby increasing the life of the shaft.

A convenient method for coupling the adapter and insert is to threadably couple them together so that the axial adjustment may be effected by selective rotation of the adapter or insert relative to the other.

A general object of the invention is to provide a new rotary seal assembly in which the axial location of the seal on the running surface of the shaft may be conveniently varied.

BRIEF DESCRIPTION OF THE DRAWINGS

Other objects of this invention will become apparent from the following description and accompanying drawing wherein.

DETAILED DESCRIPTION

Figures 1, 2:
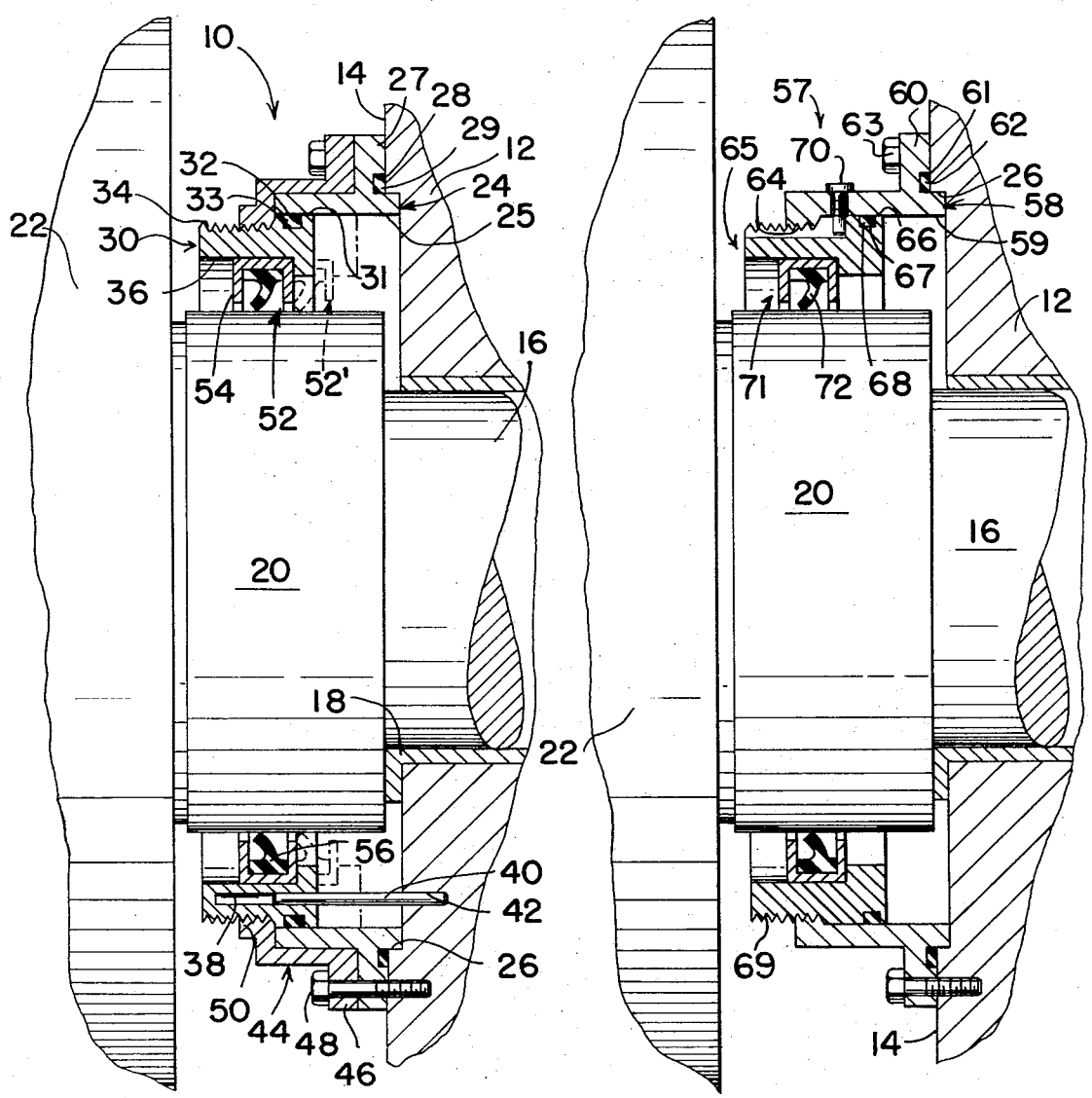
FIG. 1 is a longitudinal sectional view of one embodiment of a rotating seal assembly according to the present invention.
FIG. 2 is a similar view of a second embodiment of a rotary seal assembly according to the present invention.

Referring to FIG. 1, a rotary seal assembly is generally indicated at 10 in association with an internal combustion engine, not fully shown. The engine includes an engine block, partially shown at 12, having a rear mounting face 14. A crankshaft 16 is rotatably mounted in the block by a plurality of sleeve-type main bearings, one of which is shown at 18. The crankshaft has an increased diameter rearward end portion 20 disposed outwardly of rear mounting face 14. A flywheel, partially shown at 22, is mounted on portion 20 of the crankshaft in the usual manner.

Seal assembly 10 includes a cylindrical, ring-shaped adapter 24 which is piloted in a counterbore 26 provided in rear mounting face 14. The adapter has an axial through bore 25 through which crankshaft 16 passes and a radially extending flange 27. An annular groove 28, formed in the inner face of the flange, has a static seal 29 disposed therein to form a static seal between the adapter and face 14. A hollow seal retainer, generally designated at 30, includes an outer cylindrical surface portion 31 on one end thereof which is slidably mounted within through bore 25 of adapter 24.

Retainer 30 has an annular groove 32 formed thereon to mount an O-ring seal 33 therein for the purpose of forming a static seal between retainer 30 and adapter 24. The other end of the seal retainer is provided with an outer threaded portion 34. A counterbore 36 is formed on the inside of the retainer. The seal retainer is also provided with a bore 38 for slidably receiving one end of an elongated pin 40. The other end of the pin is secured in a bore 42 provided in rear mounting face 14 of block 12.

A stepped sleeve 44 is slidably mounted on adapter 24 and includes a radially extending flange 46 disposed in abutting relation with respect to flange 27 of the adapter. A plurality of circumferentially disposed bolts 48 extend through flanges 46 and 27 and into threaded engagement at rear face 14 of the block for securing purposes. The stepped sleeve is also provided with a reduced diameter threaded portion 50 which is adapted to threadably engage threaded portion 34 of the seal retainer.

A lip-type seal assembly 52 includes a metal carrier 54 which contains a lip seal 56. The seal assembly is secured to the seal retainer 30 by press-fitting the carrier 54 within counterbore 36 thereof. The lip seal circumvents increased diameter rear end portion 20 of the crankshaft for dynamic sealing purposes.

In operation, prolonged rotation of crankshaft 16 will cause lip seal 56 to wear a groove into the surface of increased diameter portion 20 of the crankshaft. When this occurs, the effectiveness of the seal deteriorates to a point where lubricating fluid contained in the engine block will leak therepast. To overcome this leakage, seal assembly 52 can be axially moved so that seal 56 will run on an unworn portion of crankshaft portion 20. This is accomplished by removing bolts 48 and by rotating stepped sleeve 44. Because of the threaded coupling between stepped sleeve 44 and seal retainer 30, the seal retainer is caused to move axially upon such rotation to another location, such as that indicated by broken lines 52'. The rotation of the seal retainer with the stepped sleeve is effectively prevented by pin 40. After such rotation, bolts 48 are replaced to lock the seal assembly in its new position.

FIG. 2 illustrates a second embodiment 57 of the rotary seal assembly of this invention. The seal assembly includes a cylindrical, ring-shaped adapter 58 which is piloted into counterbore 26 of rear face 14 of the engine block as described above. Adapter 58, like adapter 24, has an axial through bore 59 for passing crankshaft 16 therethrough. A radially extending flange 60 has an annular groove 61 formed in its inner face to mount a static seal 62 therein. A plurality of circumferentially disposed bolts 63 extend through flange 60 and into rear face 14 for securing purposes.

One end of the surface of adapter 58 defining through bore 59 has a reduced diameter threaded portion 64. A hollow seal retainer, generally designated at 65 and similar in construction to retainer 30 of FIG. 1, is received within through bore 59. Retainer 65 has an outer cylindrical surface portion 66 having an annular groove 67 formed thereon to retain a static seal 68 therein. An outer threaded portion 69 also formed on the retainer is adapted to threadably engage threaded portion 64 of adapter 58. A radially disposed set screw 70 extends through adapter 58 and into portion 66 of the retainer.

A lip seal assembly 71 and lip seal 72 are carried by the retainer in a manner similar to the manner in which lip seal assembly 52 and lip seal 56 are carried by retainer 30 of the FIG. 1 embodiment. The axial location of retainer 65 may be changed by removing set screw 70 and by simply rotating retainer 65. After such rotation, set screw 70 is replaced to prevent further rotation of retainer 65 during operation.

What is claimed is:

1. A rotary seal assembly for providing a dynamic seal between a rotating shaft and a stationary housing comprising
   a ring-shaped adapter member adapted to be mounted on a housing to circumvent a shaft,
   a ring-shaped insert member adapted to be slidably received within said adapter member,
   means forming a static seal between said adapter member and said insert member,
   dynamic seal means carried by said insert member and adapted to contact a shaft in dynamic sealing engagement therewith, and
   means coupling said insert member and said adapter member together for axial movement relative to each other whereby the axial location of said insert member within said adapter member may be varied selectively.

2. The assembly of claim 1 wherein said means for forming a static seal between said adapter member and said insert member comprises an annular groove formed in an outer surface of said insert member and an O-ring seal disposed within said annular groove.

3. The assembly of claim 1 wherein said dynamic seal means comprises a lip seal carried on an inner surface of said insert member.

4. The assembly of claim 1 wherein said means for coupling the insert member and the adapter comprises a first threaded portion formed on the inner surface of said adapter and a second threaded portion formed on the outer surface of said insert member which threadably engages said first threaded portion whereby said axial location is varied by the selective rotation of one of said adapter and insert members relative to the other member.

5. The assembly of claim 4 wherein said adapter member is releasably mounted on a housing and said assembly further comprises means fixedly coupling said insert member to said housing thereby permitting said axial location to be varied by releasing said adapter member from said housing and by rotating said adapter member relative to said insert member.

6. The assembly of claim 5 wherein said means for fixedly coupling said insert member to said housing comprises an elongated pin extending axially from said insert member into said housing.

7. The assembly of claim 4 wherein said adapter is fixedly mounted to a housing, said assembly further comprising means releasably coupling said adapter member and said insert member together to prevent relative rotation therebetween to thereby permit said axial location to be varied by releasing said means for fixedly and releasably coupling said adapter member for said insert member together and by rotating said insert member relative to said adapter member.

8. The assembly of claim 7 wherein said means for fixedly and releasably coupling said adapter member and said insert member together comprises a set screw extending radially through said adapter member and into said insert member.

9. A lip seal assembly providing an axially adjustable seal between a running surface of a crankshaft and an engine block associated with said crankshaft comprising
   a ring-shaped adapter member mounted on said engine block to circumvent said crankshaft,
   a ring-shaped lip seal retainer member slidably received within said adapter member,
   an annular groove formed on an outer surface of said retainer member,
   an O-ring seal disposed in said annular groove to contact an inner surface of said adapter member in static sealing engagement therewith,
   a lip seal carried on the inner surface of said retainer member to contact the running surface of the crankshaft in dynamic sealing engagement therewith,
   a first threaded portion formed on said adapter member, and
   a second threaded portion formed on said retainer member and threadably engaged with said first threaded portion whereby the axial location of said retainer member relative to said adapter member may be varied by the selective rotation of one of said adapter and retainer members relative to the other member.

* * * * *